(12) United States Patent
Cognata et al.

(10) Patent No.: US 11,186,387 B2
(45) Date of Patent: Nov. 30, 2021

(54) VARIABLE HEAT REJECTION DEVICE

(71) Applicant: Evening Star Technology Development Ltd., Houston, TX (US)

(72) Inventors: Thomas Jaspero Cognata, Houston, TX (US); Darren Hartl, College Station, TX (US); Craig E. Dinsmore, Houston, TX (US)

( * ) Notice: Subject to any disclaimer, the term of this patent is extended or adjusted under 35 U.S.C. 154(b) by 54 days.

(21) Appl. No.: 16/298,075

(22) Filed: Mar. 11, 2019

(65) Prior Publication Data
US 2019/0308753 A1 Oct. 10, 2019

Related U.S. Application Data

(63) Continuation-in-part of application No. 14/960,301, filed on Dec. 4, 2015, now Pat. No. 10,228,197.

(60) Provisional application No. 62/123,999, filed on Dec. 4, 2014.

(51) Int. Cl.
*B64G 1/50* (2006.01)
*B64G 1/58* (2006.01)
*F28F 13/18* (2006.01)
*F28F 13/00* (2006.01)

(52) U.S. Cl.
CPC ............... *B64G 1/50* (2013.01); *B64G 1/58* (2013.01); *F28F 13/00* (2013.01); *F28F 2255/04* (2013.01)

(58) Field of Classification Search
USPC .............. 165/89, 96, 98; 244/171.7, 171.8
See application file for complete search history.

(56) References Cited

U.S. PATENT DOCUMENTS

| | | | | |
|---|---|---|---|---|
| 3,307,783 A | * | 3/1967 | Wiebelt | B64G 1/50 236/1 R |
| 3,768,754 A | * | 10/1973 | Janes | B64G 1/50 244/171.8 |
| 4,603,731 A | * | 8/1986 | Olsen | B64G 1/503 165/171 |
| 4,666,107 A | * | 5/1987 | Berry | B64G 1/222 136/292 |
| 4,832,113 A | * | 5/1989 | Mims | B64G 1/222 165/41 |
| 5,732,765 A | * | 3/1998 | Drolen | B64G 1/50 165/41 |
| 5,794,890 A | * | 8/1998 | Jones, Jr. | F28D 15/0275 244/171.8 |
| 7,080,681 B2 | * | 7/2006 | Wert | F28D 15/025 165/104.21 |
| 8,109,472 B1 | * | 2/2012 | Keller | B64G 1/443 244/172.7 |

(Continued)

*Primary Examiner* — Frantz F Jules
*Assistant Examiner* — Jason N Thompson
(74) *Attorney, Agent, or Firm* — Egbert, McDaniel & Swartz, PLLC

(57) ABSTRACT

A heat rejection system that employs temperature sensitive shape memory materials to control the heat rejection capacity of a vehicle to maintain a safe vehicle temperature. The technology provides for a wide range of heat rejection rates by actuation of the orientation or position of a heat rejection panel which impacts effective properties of the heat rejection system in response to temperature. When employed as a radiator for crewed spacecraft thermal control this permits the use of higher freezing point, non-toxic thermal working fluids in single-loop thermal control systems for crewed vehicles in space and other extraterrestrial environments.

17 Claims, 6 Drawing Sheets

(56) References Cited

U.S. PATENT DOCUMENTS

2016/0297552 A1\* 10/2016 Moser ..................... B64G 1/58

\* cited by examiner

VARIABLE HEAT REJECTION DEVICE

CROSS-REFERENCE TO RELATED APPLICATIONS

The present application is a continuation-in-part of U.S. patent application Ser. No. 14/960,301, filed Dec. 4, 2015, presently pending. U.S. patent application Ser. No. 14/960,301 claims priority from Provisional Patent Application Ser. No. 62/123,999, filed on Dec. 4, 2014.

STATEMENT REGARDING FEDERALLY SPONSORED RESEARCH OR DEVELOPMENT

Some embodiments of this invention were developed with United States Government support under the National Aeronautics and Space Administration (NASA) announcement NNL12A3001N through award 12-12GCTC-0013. The Government may have certain rights in the invention.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

This invention relates to providing a system for improved heat rejection. More particularly, this invention relates to providing a system for variable heat rejection in vehicles that experience highly varying thermal environments, highly varying heat loads, or both.

2. Description of Related Art Including Information Disclosed Under 37 CFR 1.97 and 37 CFR 1.98

Hardware or vehicles that experience such variability in thermal conditions are common in space exploration and this variability causes a difficult thermal control challenge. Maintaining thermal control is critical for the function of vehicle electronics as well as life-support systems for crewed vehicles. The thermal control system must maintain a relatively constant internal environment temperature, especially in the case of crewed vehicles, despite the vastly varying thermal conditions. However, radiator systems used for this thermal control are limited in their turn-down, or range of heat rejection capacity. This limitation, a function of the basic design limitations of the current state-of-the art, having a constant area, view factor, and emissivity, drives thermal control system design toward choices such as toxic fluids with low freezing points, complex controls, limited missions, and multi-loop systems which increase cost, complexity and mass.

High turn-down is of particular interest for deep space exploration, such as for travel to and exploration of other planets, where an exploration vehicle spends large periods of time in extreme cold when in transit, but operates in a hot or variable environment when orbiting or exploring such bodies. A variable heat rejection system with high turn-down can enable single-loop thermal control systems throughout such a mission, thereby significantly reducing complexity and mass of an exploration vehicle. High turn-down variable heat rejection also enables unique spacecraft power plants that may not be in use continuously, and expands the potential range of modern space travel.

For the reasons above, The need for improved variable heat rejection in space exploration has informed the development of related variable heat rejection devices, including stagnating radiators (U.S. Pat. No. 9,109,843), mechanically louvered (U.S. Pat. No. 3,872,911) and MEMS louvred radiators (U.S. Pat. No. 6,538,796), electrostatically augmented radiative surfaces (U.S. Pat. No. 6,899,170), electrochromic radiators (U.S. Pat. No. 8,679,582), and pressure driven expandable radiators (U.S. Pat. No. 4,813,476). A higher turn-down than has been thus far achieved is needed though for deep space exploration, with projections that better than 12:1 turn-down is required for a Martian mission. Some projections suggest a turn-down of 100:1 may be needed for other deep space missions of the future. Passive high turn-down heat rejection may also find broader application in general mobile or stationary power plant and facility temperature control through simplified controls design, improved reliability and broader environment capability.

OBJECTS AND FEATURES OF THE INVENTION

A primary object and feature of the present invention is to provide a heat rejection system that varies the heat rejection capacity from a vehicle and has a high turn-down to overcome the above mentioned problem. t is a further object and feature of the present invention to provide a thermal energy radiator that controls heat rejection capacity by way of a temperature sensitive shape memory material.

A further object and feature of the present invention is to provide a thermal energy radiator that can control heat rejection passively, without active control or instrumentation, by virtue of the temperature sensitive behavior of a shape memory material.

A further object and feature of the present invention is to provide a thermal energy radiator that actuates or changes shape of the radiator, by way of a shape memory material, which when above a transition temperature of said material increases heat rejected, and which when below a transition temperature of said material decreases heat rejected.

A further object and feature of the present invention is to provide a thermal energy radiator that when actuated or when shape changes it obscures or exposes active surfaces of heat rejection such that the effective view factor or area increases above a transition temperature and decreases below a transition temperature.

A further object and feature of the present invention is to provide a thermal energy radiator that when actuated or when shape changes it obscures or exposes surfaces of high and low emissivity in a such that the effective emissivity increases above a transition temperature and decreases below a transition temperature.

A further object and feature of the present invention is to provide a means for transport of heat energy to and from a thermal energy radiator such that when actuated or when shape changes it does not induce stress or loading upon the thermal energy radiator as a consequence of a temperature gradient in the material or fluid transporting heat energy.

Yet another object and feature of the present invention is to provide a heat rejection system where an array of actuating or shape changing radiators may be arranged such that the heat rejection from the system varies in a relatively smooth manner and such that the temperature returning to the vehicle tends to approach a transition temperature of the shape memory material elements of the system.

A further object and feature of the present invention is to provide such a system that has low complexity, is efficient, lightweight, and useful. Other objects and features of this invention will become apparent with reference to the following descriptions and appended claims.

BRIEF SUMMARY OF THE INVENTION

In accordance with a preferred embodiment hereof, this invention provides a heat rejection system, related to variable heat emissions for the thermal control of extraterrestrial vehicles, that employs temperature sensitive shape memory materials to actuate a thermal energy radiator such that effective thermal energy emissions are increased above a transition temperature and decreased below a transition temperature, where said transition temperatures may not be identical. Said heat rejection system comprises: at least one thermal energy radiator structured and arranged to reject heat from at least one heat source; at least one thermal transport system consisting of at least one thermal loop which transfers heat from said heat source to said thermal energy radiator, and at least one thermal connector structured and arranged to thermally connect such at least one thermal loop to said at least one thermal energy radiator, wherein said thermal loop comprises at least one thermal transport fluid structured and arranged to transport such collected heat; wherein such at least one thermal energy radiator contains at least one temperature sensitive shape memory material integral to the structure of said thermal energy radiator, wherein such shape memory material takes at least one shape above a transition temperature and at least one other shape below a transition temperature, which may contain at least one bias loading structure integral to the structure of said thermal energy radiator; wherein such thermal energy radiator system is structured and arranged to actuate the position of such a thermal energy radiator.

Moreover, it provides such a heat rejection system wherein such at least one thermal energy radiator contains at least one temperature sensitive shape memory structure containing a shape memory material with properties that comprise: a remembered or trained condition at a temperature below at least one transition temperature of said material wherein a trained shape, or shape memory, is recovered; a remembered or trained condition at a temperature above at least one transition temperature of said material wherein a trained shape, or shape memory, is recovered; wherein such recovery alters said material to take its remembered shape by means of force as is consistent with established two-way behavior of shape memory materials.

Additionally, it provides such a thermal energy radiator further comprising a thermally conductive structure consisting of: a thermally conductive structure structured or arranged to transport heat from above described thermal connector to the active heat rejection surface of the thermal energy radiator; a thermally conductive structure further structured and arranged to communicate thermal energy temperature to or near the above described shape memory structure; wherein the above described structure may be inclusive of thermal transporting fluid and said shape memory structure, or said thermally conductive structure may be in addition to said shape memory structure. Also, it provides a thermal energy radiator such that said said temperature sensitive shape memory material are structured and arranged to produce a temperature dependent orientation or position of at least one thermal energy radiator consisting of: at a temperature above at least one transition temperature of said at least one thermal energy radiator shape memory material, in above described condition wherein it recovers a remembered shape, applies a forcing load and said radiator takes at least one orientation or position having a high heat rejection capacity; at a temperature below at least one transition temperature of said at least one thermal energy radiator shape memory material, in above described condition wherein it recovers a remembered shape, applies a forcing load and said radiator takes at least one orientation or position having a low heat rejection capacity.

In addition, it provides such a heat rejection system wherein such at least one thermal energy radiator takes at least two orientations or position comprising: at least one shape which results in a low heat rejection capacity through the obscuring and exposing of surfaces to reduce effective view factor, effective area, and effective emissivity, orientation to a fluid, or any combination of parameters of heat rejection; at least one shape which results in a high heat rejection capacity through the obscuring and exposing of surfaces to increase effective view factor, effective area, and effective emissivity, or any combination of these parameters of heat rejection; wherein said high heat rejection shape exposes a high emissivity active heat rejection surface, increasing the view factor of said surface to space, via the shape memory behavior above described; wherein said low heat rejection shape obscures said high emissivity active heat rejection surface by causing it to view itself and exposing instead the opposite surface of the thermal energy radiator having very low emissivity to space, decreasing the view factor of the active surface. In addition, it provides such a heat rejection system wherein such at least one thermal energy radiator may have thermal energy radiation shields or covers placed over gaps or open ends of the low heat rejection shape such that heat rejection through said open ends is minimized; said shields may be permanent or deployable by any means.

In addition, it provides such a heat rejection system wherein at least one such thermal energy radiator may be structured and arranged in an array such that the heat rejection capacity varies in a smooth manner comprising: an array of said thermal energy radiator systems arranged in parallel, series, or both; an array thermal transport system as otherwise described above by the thermal transport system which is structured and arranged to transport heat within said array to each such thermal energy radiator in the order with which said array is arranged; wherein said array thermal transport system comprises at least one thermal transport fluid as otherwise described above; wherein thermal energy emission from a given thermal energy radiator in said array changes the thermal transport fluid temperature passing the position of said thermal energy radiator creating a temperature gradient in the array thermal transport system; wherein each thermal energy radiator system responds to temperature local to its position on the array heat transport system which causes thermal energy radiators at positions in the array thermal transport system with a temperature above at least one transition temperature of the thermal energy radiator to take a high heat rejection shape, and causes thermal energy radiators at positions in the array thermal transport system with a temperature below at least one transition temperature of the thermal energy radiator to take a low heat rejection shape and thus limit heat rejection and also; wherein such point where a transition occurs in the array thermal transport system moves upstream or downstream as vehicle heat load or thermal environment varies so that the number of thermal energy radiators in a given heat rejection state also varies with said stimuli; wherein the quantity and width of such thermal energy radiators in said array determines the smoothness of variation in heat rejection capacity of the heat rejection system.

Moreover, it provides such a radiator system wherein such temperature sensitive behavior of the above described shape memory structures in response to thermal conditions is passive in nature requiring no instrumentation, requiring no active control, and requiring no addition of power other than that contained by the thermal energy being rejected. Further, said heat rejection system behaves as described continuously in response to thermal conditions over the operating life of said heat rejection system once initiated into service unless and until an external means restrains its function.

BRIEF DESCRIPTION OF THE SEVERAL VIEWS OF THE DRAWINGS

FIGS. 6A, 6B and 6C illustrate the torque tube assembly of an embodiment of the present invention, wherein FIG. 6B illustrates the torque tube assembly the first temperature T1, and FIG. 6C illustrates the torque tube assembly in the second temperature T2.

DETAILED DESCRIPTION OF THE INVENTION

Figure 1:
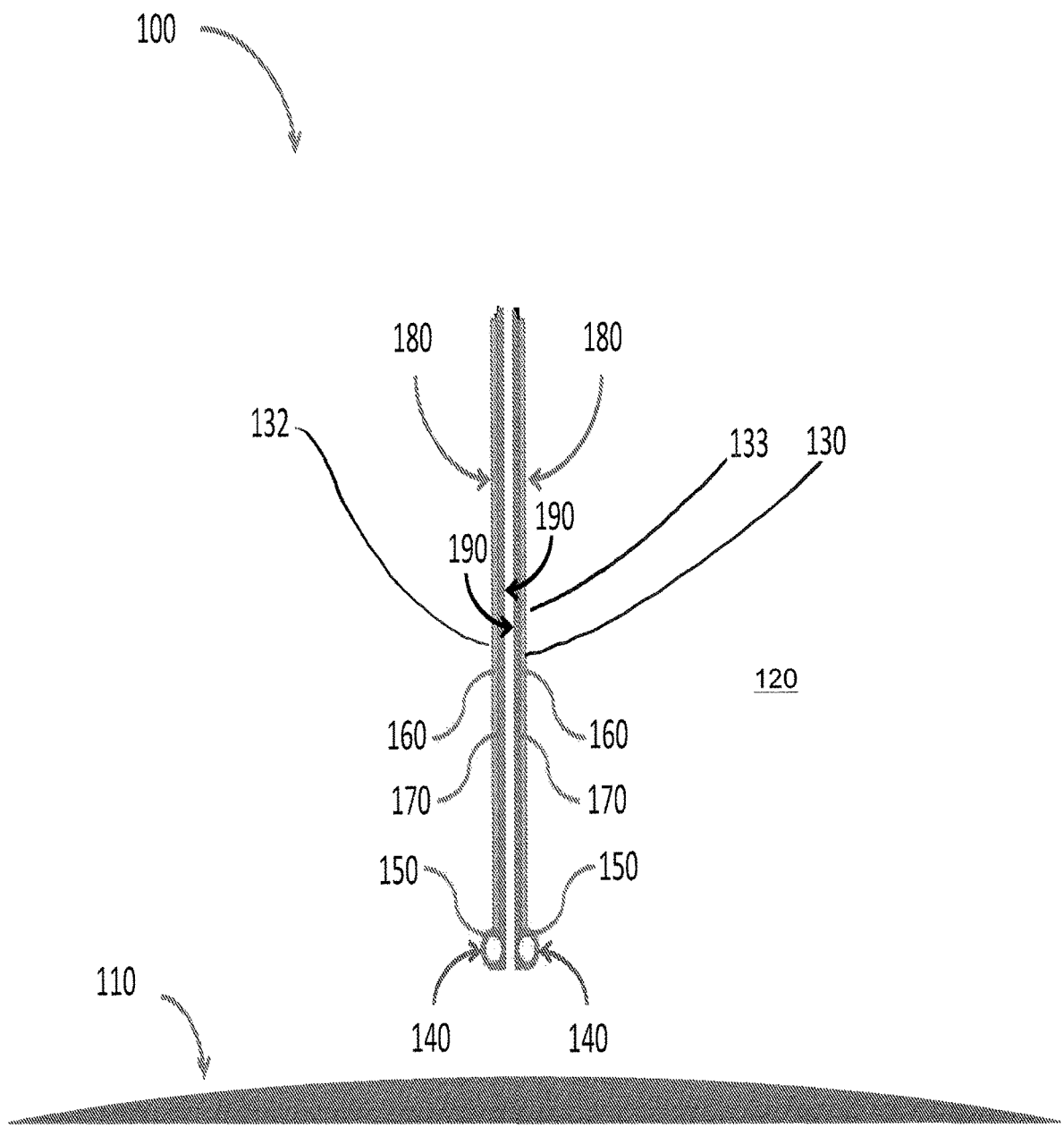
FIG. 1 and FIG. 2 shows a diagrammatic cross sectional view illustrating a cold or low heat rejection state (FIG. 1) and a warm or high heat rejection state (FIG. 2) of a thermal energy radiator according to a preferred embodiment of the present invention.
Figure 2:
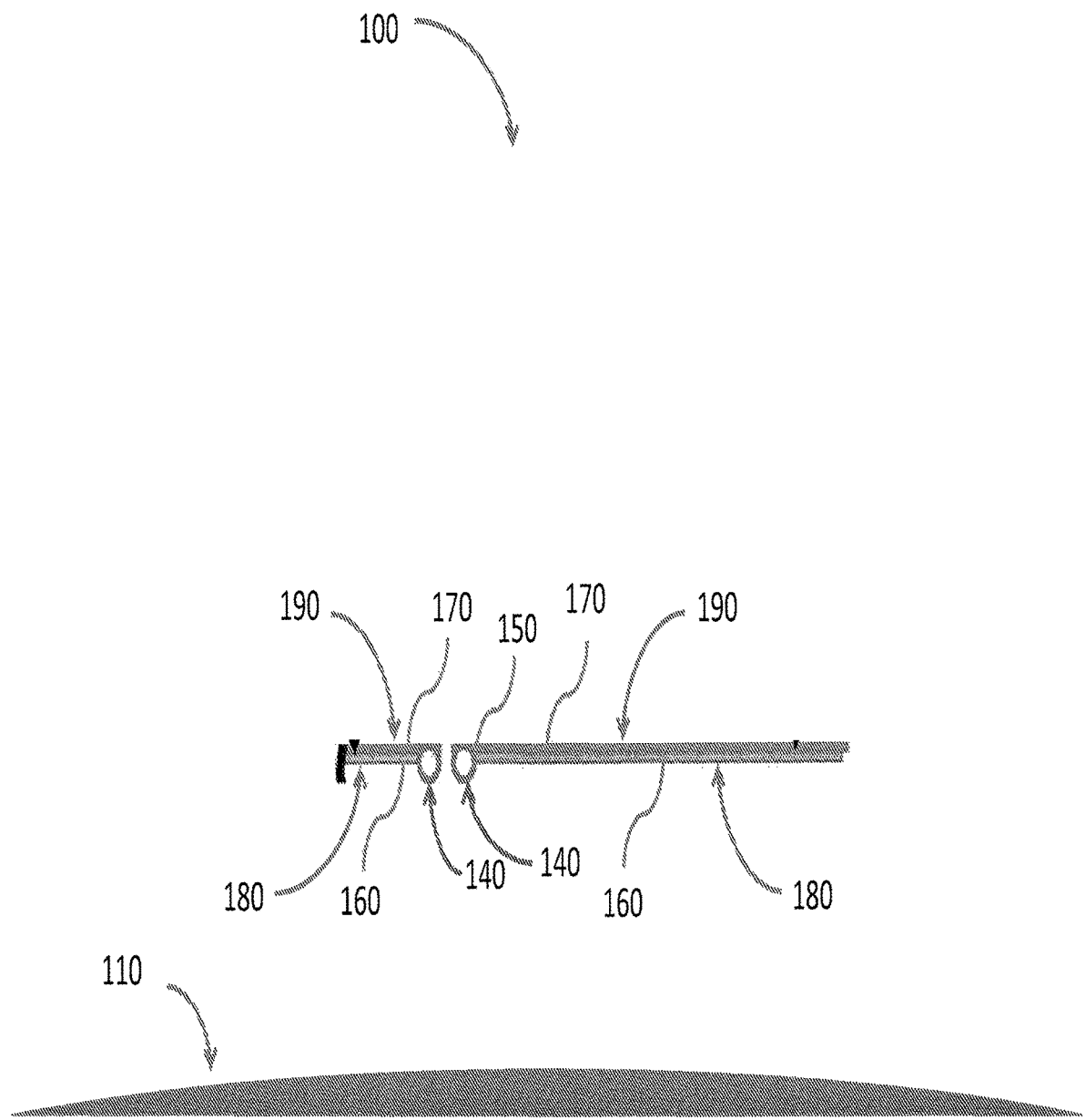

FIG. 1 and FIG. 2 show a diagrammatic cross sectional view illustrating a cold or low heat rejection state and a warm or high heat rejection state, respectively, of thermal energy radiator system 100 at least one of which comprises a key and enabling element of a heat rejection system 300 (see FIG. 3) according to a preferred embodiment of the present invention. A spacecraft, satellite or other extraterrestrial vehicle 110 (shown in part only and to rough scale) preferably includes an environment 310 for crew 320, heat generating hardware and systems 330, or both, and at least one thermal energy radiator system 100. Heat is preferably collected from heat sources within the vehicle 110 and transported to a heat rejection system 300 by means of a thermal control system 310.

Extraterrestrial environment 120 comprises a range of temperatures and other conditions that are uninhabitable by humans and inhospitable to electronics, avionics and hardware, and thus requires the use of a thermal control system to maintain a vehicle environment 310 hospitable to the intended mission and function of the vehicle 110. In the case of a crewed vehicle 110, the vehicle environment 310 must be human-life supporting, and preferably comprises an enclosed space with artificially-controlled atmospheric conditions hospitable to human life. Any exchange between vehicle environment 310 and the external environment 120 is preferably controlled to maintain these conditions.

Figure 3:
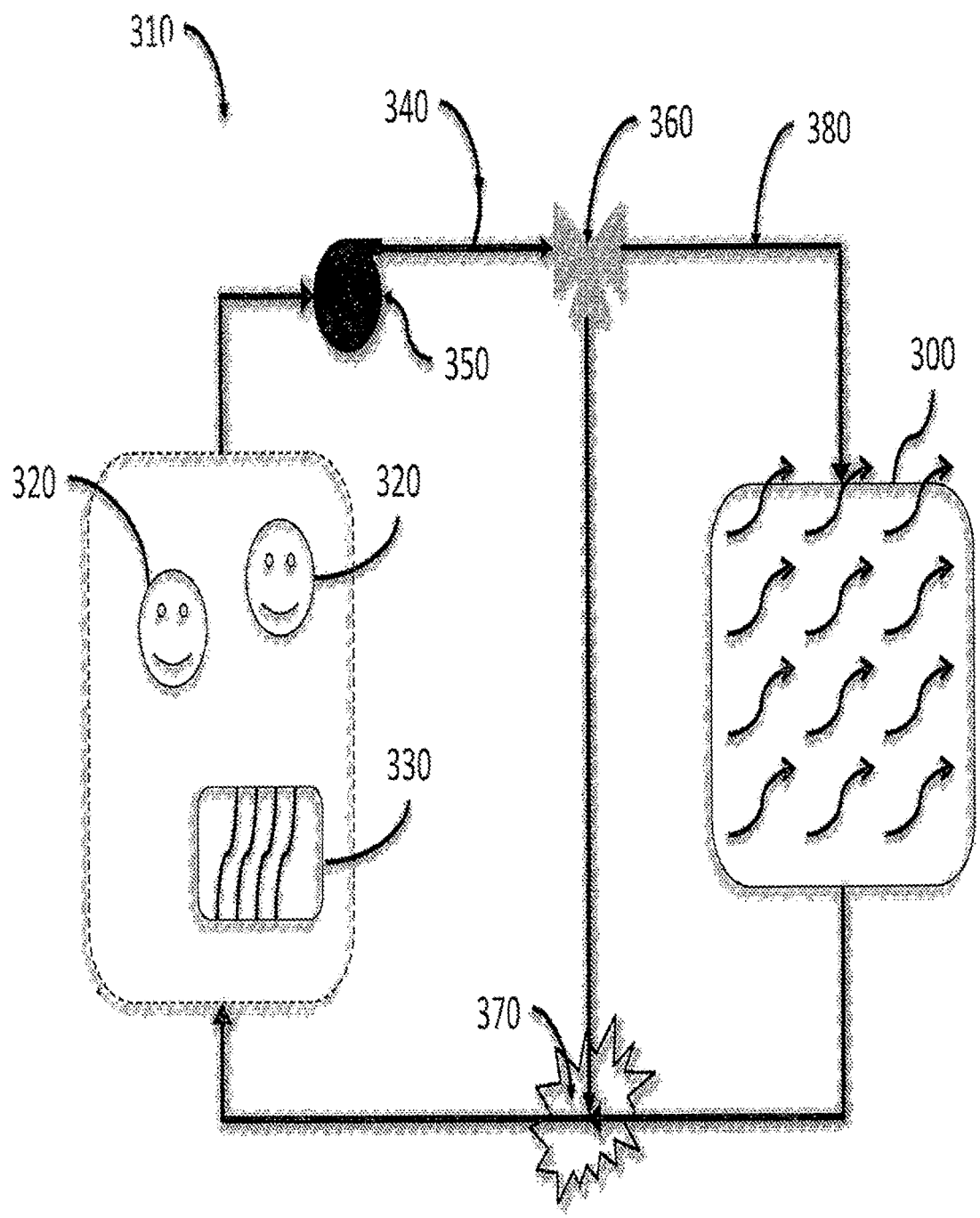
FIG. 3. shows a diagrammatic view illustrating a thermal fluid heat transport system having at least one heat rejection system according to the preferred embodiment of FIG. 1 and FIG. 2.

Heat rejection system 300 preferably functions to regulate the temperatures of the manned spacecraft 110, by transporting heat to at least one thermal energy radiator 100 which preferably emits heat into the external environment 120. Manned spacecraft 110 preferably comprises multiple subsystems each of which are heat sources and are temperature sensitive. Heat must be transported away from such subsystems to maintain temperatures within operating ranges. Likewise, human-life supporting environment 310 preferably utilizes temperature regulation to maintain a comfortable environment. Primarily, heat rejection system 300 preferably transports heat away from at least one heat source as shown in FIG. 3, to at least one thermal energy radiator 100 to be radiated into external environment 120.

When manned spacecraft 110 operates with all subsystems running at full capacity, the heat load rejected preferably is at maximum capacity of the heat rejection system 300. Should a spacecraft continuously need to operate only at or near this maximum heat load, a heat rejection system 300 for the spacecraft only need be designed to transport a narrow range of heat and operate continuously at that level of heat transportation. However, when a spacecraft operates in multiple configurations, having differing subsystems operating simultaneously, the heat load may be anywhere from maximum (all subsystems running) to a minimum (all or nearly all subsystems in standby generating nearly no heat). Manned spacecraft 110 is preferably utilized with such a widely varying heat load, preferably over the course of an operational run, alternately preferable over the course of multiple operational runs.

Further, the thermal environment 120 to which the thermal energy radiator emits heat varies. When vehicle 110 orbits a planet the thermal environment 120 cycles as a function of orbital period where periods of warm temperature occur in view of the sun and periods of cold temperature occur in the shadow of the planet. Vehicle 110 in transit to a distant planet, satellite, or other celestial body experiences long periods of extreme cold preceded and followed by a much warmer cyclic orbital thermal environment 120. Vehicle 110 which further explores other celestial bodies can experience a wide range of thermal environment 120 depending on the size of the body, the presence of atmosphere, and relative orientation on the body with respect to the sun, and the rotating period of the body. When a thermal energy radiator 100 emits heat to a warm thermal environment 120, its capacity to emit heat is less than when the same radiator emits heat to a cold thermal environment 120. As with heat load, should a spacecraft 110 operate in a constant thermal environment 120, a heat rejection system 300 need be designed only to reject a narrow range of heat. Where spacecraft 110 rejects heat to a varying thermal environment 120, it must be designed to reject the maximum heat load at the warmest environment temperature (the hot condition), and to reject the minimum heat load at the coldest environment temperature, (the cold condition). Manned spacecraft 110 is preferably utilized with such a widely varying thermal environment, preferably over the course of an operational run, alternately preferable over the course of multiple operational runs.

Upon reading the teachings of this specification, those skilled in the art will now appreciate that, under appropriate circumstances, considering such issues as cost, future technologies, etc., other applications of heat rejection systems, such as, for example, non-terrestrial planetary colonies and terrestrial applications for which convection may be similarly augmented, and etc., may suffice.

The dangers in operating a radiator system at widely varying heat loads and thermal environments, without a variable heat load capacity, present themselves in the two extremes of operation. If a radiator system is designed for high heat loads in the warmest environment, when it then operates at low heat loads and cold environments, it transports too much heat and the subsystems of the spacecraft become too cold resulting in condensation or extreme thermal contraction and subsystem failures. Further, if this high heat load radiator system operates at too low of a temperature the thermal fluid within the radiator may freeze causing radiator failure and heat transport problems which compound when the heat load rises again.

If a radiator system is designed for lower heat loads in the coldest environment, when it operates at high heat loads, it is not capable of transporting enough heat and the subsystems of the spacecraft become overheated and fail. Likewise, personnel in either extreme condition of operation will experience life-threatening, mental, and other problems.

A radiator system is typically static in form, which is to say that once placed into service, or deployed, the radiator system is a stationary structure having a set area, a set view factor, and a set surface emissivity. These properties describe the heat rejection capacity of a thermal energy radiator system as defined by the Stefan-Boltzmann relationship which is known as $Q=\varepsilon\sigma FA(T^4-T_{env\ env}^4)$ where Q is the heat rejection, $\varepsilon$ is the emissivity of a surface, F is the view factor between objects, A is the area of the emitting surface, T is the temperature of that surface, $T_{env}$ is the temperature of the environment, and $\sigma$ is a constant. The static nature of the radiator system has generally led to approaches to the problem of variable heat load and variable environment which vary the temperature or emissivity of the surface. Examples of temperature approaches include fluid choice, where a working fluid having a very low pour point and wide operating range is used, regenerative heat exchangers, which cool the fluid entering the radiator using fluid exiting the radiator, and a stagnating fluid, where the thermal working fluid is made to stall in portions of the radiator system reducing the heat transported to those portions of the radiator. Examples of emissivity approaches include electrochromic materials, which change emissivity upon the application of a voltage. Other approaches have added hardware to the radiator which obscure the surface thus changing view factor which include louvers and micro louvers.

Figure 5:
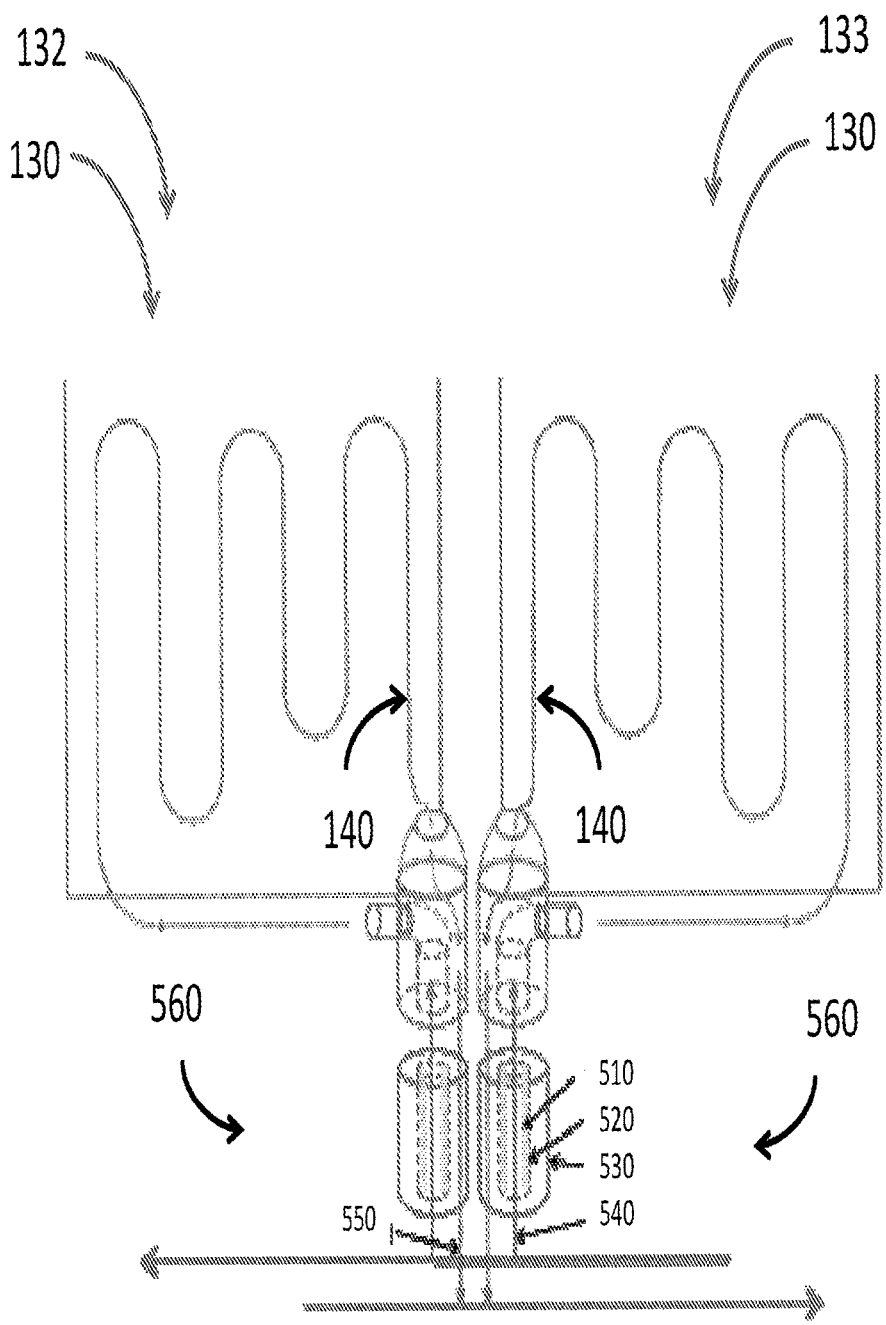
FIG. 5. Shows a diagrammatic view illustrating the shape memory structure which actuates the thermal energy radiator according to the preferred embodiment of FIG. 1 and FIG. 2.

The cold and hot shapes described in FIG. 1 and FIG. 2, respectively, of the thermal energy radiator 100 correspond in heat rejection function to the extreme cases described above, which serves to demonstrate the variable heat rejection capability of the preferred embodiment of the present invention. The thermal energy radiator 100 comprises at least one facesheet 130, at least one heat transport loop 140, and a thermal connection 150 between these elements. The facesheet further comprises a conductive structure 160 and a supporting structure 170 which may be separate as shown or combined in a multi-functional structure. The element 560 described in FIG. 5 comprising the interface between the thermal energy radiator 100 of the heat transport loop 140 in the preferred implementation contains a shape memory structure which exhibits the behavior of two-way shape memory which actuates the position of the facesheet 130. Upon reading the teaching of this specification, those skilled in the art will now appreciate that the behavior of the present invention is distinct from that of louvres and from micro-louvres as the facesheet of the preferred embodiment is actuated directly, where-as a louvre and micro-louvre is a secondary structure which is actuated to obscure or open view of the facesheet.

Two-way shape memory is a behavior of certain metal alloys, polymers, and other classes of materials whereby the material is trained to recover one of at least two shapes in the presence of stimuli. The preferred stimulus is temperature such that one shape may occur below at least one transition temperature of the shape memory material and another shape of the material is recovered when its temperature rises above at least one transition temperature. This particular behavior is referred to as two-way shape memory and is the preferred behavior of the shape memory structure 560. Upon reading the teachings of this specification, those skilled in the art will now appreciate that, under appropriate circumstances, considering such issues as cost, future applications, application parameters, etc., other shape memory behaviors, such as, for example, one-way shape memory or multiple-shape memory, may suffice.

Several shape memory alloys exhibit behavior according to the preferred stimulus. The temperature at which these shape memory alloys transition is in part a function of the alloying composition so that a shape memory structure composed of such an alloy may be tailored to the operating constraints of the spacecraft 110. The preferred shape memory material is a Nickel-Titanium based metal alloy with transition temperatures in the vicinity of 0 C. Upon reading the teachings of this specification, those skilled in the art will now appreciate that, under appropriate circumstances, considering such issues as thermal working fluid, operating temperature, future applications, application parameters, etc., other shape memory materials, such as, for example Copper and ferrous based shape memory materials or shape memory polymers, etc., and other transition temperature ranges, may suffice.

The facesheet structure 130 preferably is a multi-functional sheet having adequate form and thermally conductive behavior to meet the function of the conductive structure 160 and support structure 170. The facesheet structure 130, including at least one such structure 132 which may be in conjunction with a mirrored second such structure 133 as shown in the preferred embodiment, is actuated by the shape memory structure 560 to take a position that corresponds generally with the cold shape of the thermal energy radiator 100 shown in FIG. 1 or the hot shape of the thermal energy radiator 100 shown in FIG. 2. The conductive structure 160 transports heat conductively from the heat transport loop 140 to the active surface 190 of the thermal energy radiator facesheet 130. It also serves thus to communicate local temperature of the thermal energy radiator facesheet 130 to the shape memory structure 560. The multi-functional conductive structure 160 and supporting structure 170 preferably comprises a high conductivity carbon fiber composite material for the combined high stiffness, high thermal conductivity, and weight efficiency. Upon reading the teachings of this specification, those skilled in the art will now appreciate that, under appropriate circumstances, considering such issues as cost, future applications, available materials, etc., other materials, for example aluminum and honeycomb composites, glass fiber composites, or laminations with graphite, etc., may suffice.

Shape memory structure 560 both actuates said thermal energy radiator facesheet 130 and conveys thermal energy to the thermal energy radiator facesheet 130 by way of a thermal working fluid, 540 and 550. Said shape memory structure 560 has, for performance of the function of actuation, at least one trained memory of the shape that corresponds generally with the cold shape of the thermal energy radiator 100 shown in FIG. 1 and at least one other trained memory of the shape that corresponds generally with the hot shape of the thermal energy radiator 100 shown in FIG. 2. Shape memory structure 560 preferably comprises concentric fluid passage boundaries for conveyance of thermal energy to the thermal energy radiator facesheet 130 by way of a thermal working fluid, composed of shape memory elements with at least one fluid passage formed by boundary 520 providing a path for heat transport fluid to pass to the facesheet 130 and at least one passage boundary 530 which provides a path, preferably in the annulus between 520 and 530, for heat transport fluid to return from the facesheet 130. An insulating structure 510, preferably located within the inner most passage bounded by 520, may insulate said boundary from the temperature of the entering fluid 540. Shape memory structure 560, including shape memory elements of both inner passage boundary 520 and outer passage boundary 530, actuates upon the temperature of the exiting fluid 550. The shape memory structure 560 may be comprised of heat pipes, torque tubes forming fluid loops (as described below in FIG. 6), or other structures. Upon reading the teachings of the specifications, those skilled in the art will now appreciate that, under appropriate circumstances, considering such issues as cost, future applications, available materials, etc., other configurations of the shape memory structure, for example reverse direction of flow, having flexible material rather than shape memory elements composing at least one passage boundary, having concentric cross sections that are not circular, having eccentric, off center, or other relative positioning, having wicking structure or open structure composing fluid passage, etc., may suffice.

One preferred embodiment of the shape memory structure 560 conveys thermal energy by way of a gaseous phase entering fluid 540 and liquid phase exiting fluid 550. In this embodiment the temperature of entering fluid 540 and exiting fluid 550 may not differ sufficiently to necessitate insulating structure 510. A second preferred embodiment of the shape memory structure 560 conveys thermal energy by way of a liquid phase entering fluid 540 and liquid phase exiting fluid 550. In this embodiment the temperature of entering fluid 540 and exiting fluid 550 may differ considerably thus insulating structure 510 is necessary for both inner passage boundary 520 and outer passage boundary 530 to actuate upon the temperature of the exiting fluid 550. Upon reading the teachings of the specifications, those skilled in the art will now appreciate that, under appropriate circumstances, considering such issues as cost, future applications, available materials, etc., other configurations of the working fluid may include any phase of matter for the conveyance of thermal energy, or mixtures of multiple such phases, including gas, liquid, and solid, etc., may suffice.

This coupling preferably comprises shape memory structure 560 coupled to facesheet structure 130 such that force is transferred between the structures. When the temperature of exiting fluid 550 from the facesheet 130 is below at least one transition temperature of the shape memory structure 560, the shape memory structure 560 reverts to a cold memory shape resulting in the cold shape of the thermal energy radiator 100 shown in FIG. 1. When the temperature of the facesheet 130 rises above at least one transition temperature of the shape memory structure 560, the shape memory structure 560 forcibly recovers to its hot shape, resulting in the hot shape of the thermal energy radiator 100 shown in FIG. 2. Upon reading the teachings of this specification, those skilled in the art will now appreciate that, under appropriate circumstances, considering such issues as cost, future applications, available materials, etc., orientations and positions other than illustrated may be employed to the same or greater effect, such as, for example, a single panel without a mirror which actuates 180 degrees for the same effect, etc., may suffice.

The thermal energy radiator 100 further presents surfaces of differing thermal emissivity. The active surface 190 of the thermal energy radiator facesheet 130 is preferably coated or treated for a high emissivity. The active surface 190 treatment preferably comprises a silver-Teflon material, AZ93 white paint, or a treatment having significantly similar high emissivity and low solar absorptivity properties. The inactive surface 180 is preferably coated or treated for a low emissivity. The inactive surface 180 treatment preferably comprises at least one layer of aluminized mylar, where multiple layers are separated by a small gap to minimize heat transport through this side. Upon reading the teaching of this specification, those skilled in the art will now appreciate that, under appropriate circumstances, considering such issues as cost, future applications, available materials, etc., other treatments may be applied for similar effect, such as, for example, various colors of space rated paint, silvered film, multi-layer insulation, etc., may suffice.

The combination of temperature sensitive shape change and the obscuring and exposing of active 190 and inactive 180 surfaces affords a large change in effective emissivity and a change in effective view factor from the cold shape of thermal energy radiator 100 of FIG. 1 to the hot shape of the thermal energy radiator 100 of FIG. 2. This behavior results in a very low heat rejection capacity for the cold shape appropriate for low heat loads in extreme cold environments 150, and a very high heat rejection capacity for the hot shape appropriate for high heat loads in warm thermal environments 150.

FIG. 3 shows a diagrammatic view illustrating thermal control system 310 according to a preferred embodiment of the present invention which consists of a heat rejection system 300, a previously described thermally controlled environment 310 having heat sources, and a heat transport system 340 which transports heat from vehicle heat sources 320 and 330 to the heat rejection system 300. The heat transport system 310 preferably consists of at least one single-loop thermal fluid loop 380 consisting of a thermal fluid capable of transporting heat, preferably a non-toxic fluid such as propylene glycol, and may include a pump 350 and a bypass mixing valve 360 which controls flow to maintain a setpoint temperature at 370. Upon reading the teaching of this specification, however, those skilled in the art will now appreciate that the variable shape behavior of the thermal energy radiator facesheet 130 does not require a fluid loop 340 to achieve the described behavior, other thermal transport systems may be employed, such as conductive heat transport coupled directly to a heat source, thermoelectric heat transport, etc., may suffice.

Figure 4:
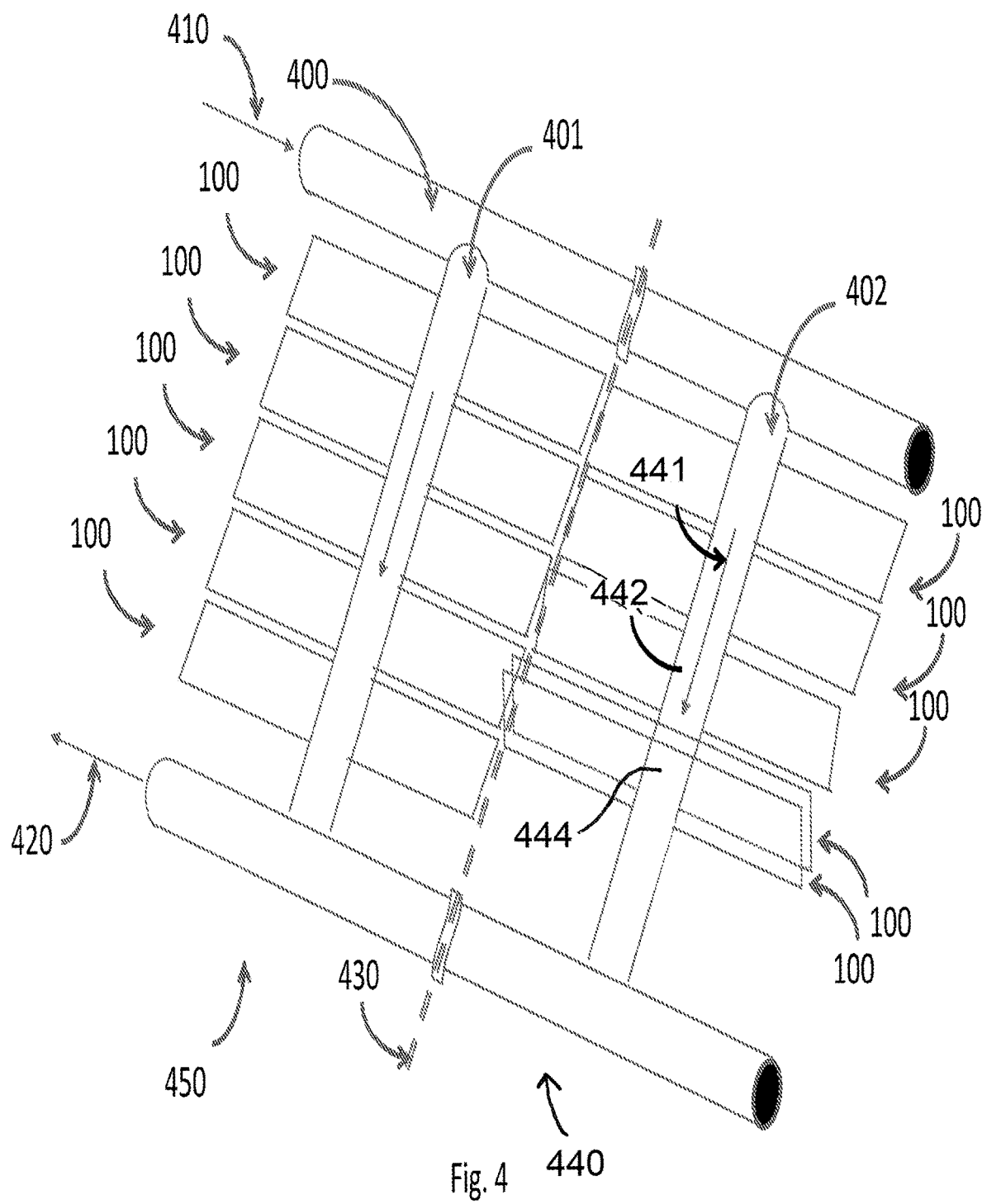
FIG. 4. shows a diagrammatic view illustrating behavior of a heat rejection system containing an array of the thermal energy radiators according to the preferred embodiment of FIG. 3.

FIG. 4 shows the heat rejection system 300 as comprised of at least one thermal energy radiator 100 arranged as an array in both series and parallel, where any arrangement in series, parallel, or both is preferred, and an array heat transport system 400 which transports heat from the heat transport system 340 to each thermal energy radiator 100 in the array according to the arrangement of the array. The array heat transport system 400 receives thermal fluid from the heat transport system 310 fluid loop 380 at an inlet to the array 410. Thermal fluid then travels from the inlet to the array 410 through the array heat transport system 400 transferring heat from the thermal fluid to at least one thermal energy radiator 100, passing in the process through fluid passages 401 and 402 according the the arrangement of thermal energy radiators 100 in the flow path, and exits the array heat transport system 400 to the vehicle heat transport system 380 by way of the array heat transport system outlet 420. Each thermal energy radiator 100 in the heat rejection system 300 responds to temperature local to its position on the array heat transport system 400. As the fluid moves along fluid passage 401 and 402, heat is transported to each thermal energy radiator 100 which rejects that heat to the thermal environment 120, thereby reducing the temperature of the fluid before it moves to the next radiator. This behavior creates a temperature gradient along fluid passages 401 and 402. This gradient, and the quantity of thermal energy radiators in the fluid path, allows for smooth variation of heat rejection system 300 heat rejection capacity.

For illustration of this smoothing behavior, FIG. 4 is separated into two independent heat load cases, high heat load case 450 to the left of imaginary line 430 and low heat load case 440 to the right of imaginary line 430. In the high heat load case 450 the inlet fluid 410 temperature is high. This high temperature fluid is distributed through fluid passages 401 where the high temperature causes all thermal energy radiators to take the high heat rejection shape. As the high temperature fluid travels along fluid passage 401 and the temperature of the fluid declines as heat is removed from it, it nevertheless does not decline to a temperature below the transition temperature of any of the thermal energy radiators 100 in fluid path 401.

In the low heat load case 440 the inlet fluid temperature is lower, but still high enough that all thermal energy radiators 100 in fluid passage 402 at and upstream of 441. At position 442 the local temperature has dropped sufficiently that a portion of the thermal energy radiator 100 at that position has fallen below the transition for that component. This process continues until at position 444 the low fluid temperature has caused the thermal energy radiator 100 to take a low heat rejection shape and thus limit heat rejection.

This smoothing behavior has the further effect of limiting the lowest fluid temperature returning to the thermal control system 310 at array heat transport system outlet 420 to a value in the vicinity of the lowest common transition temperature of the heat rejection system 300.

Turn-down of heat rejection system 300 may be increased significantly by placement of radiative shields or covers, whether permanently or temporarily, along the edge of the paired arrangement of thermal energy radiators 100 as illustrated on flow passages 401 and 402. Such a shield, to be effective, would have a low emissivity and would preferably be composed of a multilayer insulation, and would cover all gaps in the cold shape thus blocking a view of the active surface 190 of the thermal energy radiator 100 to the thermal environment 120.

Further note of the behavior is that it is continuous and passive. The taking of a hot and cold shape by the thermal energy radiator 100 occurs continuously once put into service and until arrested by an external restraint, without external action, as temperature of the radiator varies, as vehicle heat load varies, and as thermal environment 120 varies.

Figure 6A:
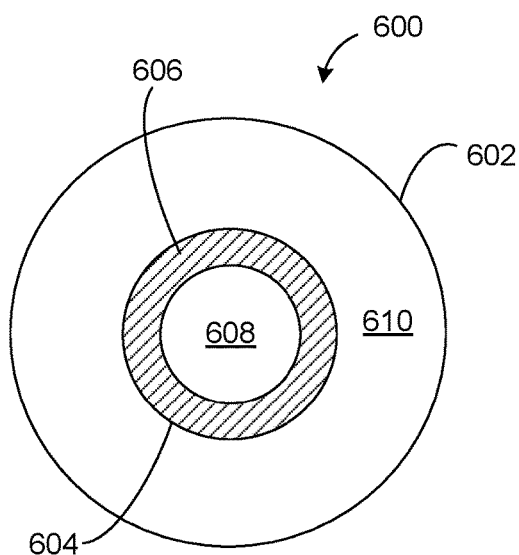
Figure 6B:
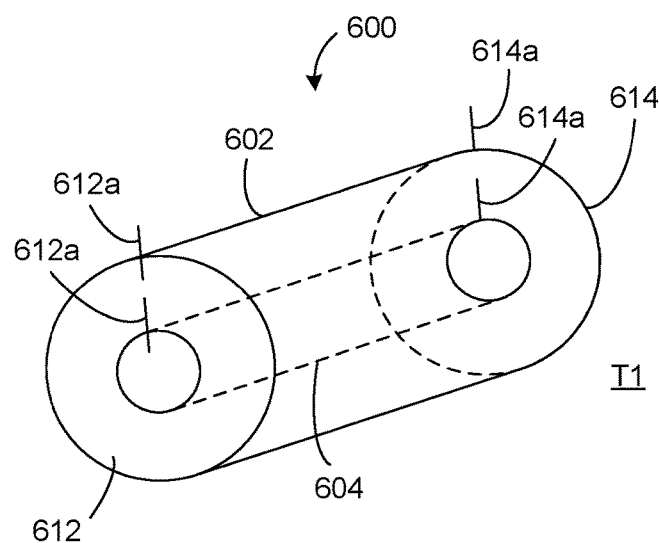
Figure 6C:
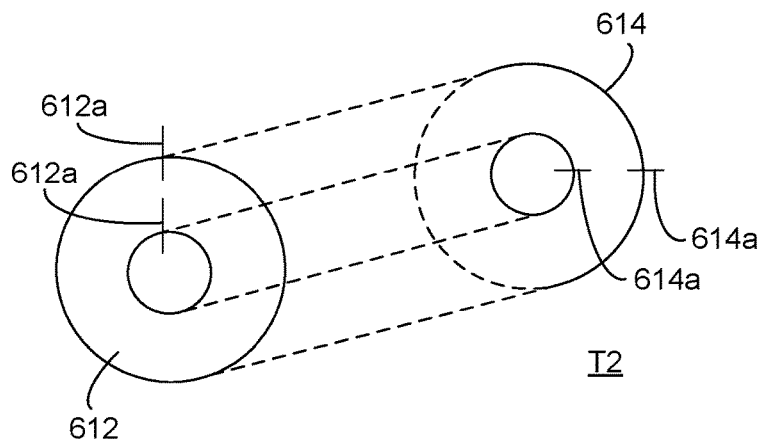

FIGS. 6A, 6B and 6C illustrate the torque tube manner in which an embodiment of the present invention operates. Specifically, FIGS. 6A-6C are close-up, schematic views of examples of various components previously shown and described in FIG. 5.

First, referring to FIG. 6A, there is shown a schematic cross-sectional view of the torque tube assembly 600 of an embodiment of the present invention. The torque tube assembly 600 contains an outer shape memory alloy torque tube 602 and an inner shape memory alloy torque tube 604. These represent one type of shape memory structure and boundaries (520 and 530 in FIG. 5) establishing fluid passageways previously described. Interior of the inner shape memory alloy torque tube 604 is a flexible insulation 606. Hot fluid 608 passes interior of the flexible insulation 606, and as such, does not act on either of the shape memory alloy torque tubes 602 and 604. A colder fluid 610 preferably is passed between the outer and inner shape memory alloy torque tubes 602 and 604. The temperature of this cold fluid 610 acts on the torque tubes 602 and 604.

Next, referring to FIG. 6B, there is shown the torque tube assembly 600 at a first temperature, T1. The torque tube assembly 600 has a fixed end 612 and a free end 614 opposite thereof. As can be seen in FIG. 6B, the indicia 612a and 614a indicate the orientation of the torque tubes 602 and 604 at this temperature T1.

Referring FIG. 6C, there is shown the same torque tube assembly 600 at a second temperature, T2. At the second temperature T2, the fluid traveling between the torque tubes 602 and 604 has caused the respective shape memory alloys to assume a second trained shape. In this second trained shape, the indicia 614a now show the tubes 602 and 604 as being rotated approximately 90° from their initial position, whereas the indicia 612a on the fixed end are still shown in the same position as at temperature T1.

Importantly, this arrangement is one which allows for the shape memory alloy structure to act as both the fluid path and the actuator for achieving a desired heat rejection. A heat pipe structure which separates entering and exiting fluid using surface tension, as opposed to using a physical fluid barrier may also be used to accomplish such results.

Although applicant has described applicant's preferred embodiments of this invention, it will be understood that the broadest scope of the invention includes modifications such as diverse shapes, sizes, arrangements, shape memory behaviors, etc. Such scope is limited only by the below claims as read in connection with the above specification. Further, many other advantages of applicant's invention will be apparent to those skilled in the art from the above descriptions and the below claims.

We claim:

1. A thermal energy radiator system having variable heat rejection capabilities, the thermal energy radiator system comprising:
a thermal transport system adapted to collect heat from a thermal energy source and transport the collected heat to a thermal energy radiator via a working fluid, said thermal energy radiator comprising:
a facesheet having a first surface and a second surface thereon, said facesheet having fluid passageways therein;
a shape memory structure, said shape memory structure comprising a material having temperature-sensitive shape memory properties, said shape memory structure having a first end and a second end, said second end being coupled to said facesheet, said shape memory structure having fluid passages that convey a working fluid between said first end and said fluid passageways of said facesheet;

wherein said second end being freely rotatable relative to said first end such that said shape memory structure repeatedly moves said second end between a first position when said working fluid is at a first temperature and a second position when said working fluid is at a second temperature, such that said first surface and said second surface of said facesheet are exposed to a thermal environment or obscured from the thermal environment by said facesheet.

2. The system of claim 1, said first surface being an active surface and said second surface being an inactive surface, said first surface having a higher emissivity value than said second surface.

3. The system of claim 1, wherein said fluid passages of said shape memory structure comprising an inner tubular member positioned within an outer tubular member, wherein a first path is defined by an inner boundary of the inner tubular member, a second path is defined by an annulus between said inner tubular member and said outer tubular member.

4. The system of claim 3, further comprising:
an insulating structure positioned within said inner tubular member.

5. The system of claim 3, said working fluid comprising a gaseous phase fluid upon entry into said fluid passageways of said facesheet, said working fluid comprising a liquid phase fluid upon exit from said fluid passageways of said facesheet.

6. The system of claim 1, wherein movement of said facesheet between said first position and said second position occurs without active control or the addition of any power other than thermal power provided by said at least one energy transport system and a thermal environment.

7. The system of claim 1, wherein:
said first surface of said facesheet being obscured from the thermal environment when said shape memory structure and said facesheet structure are in said second position; and
said first surface of said facesheet being exposed to the thermal environment when said shape memory structure and said facesheet structure are in said first position.

8. The system of claim 7, said thermal energy radiator having a plurality of facesheets and a plurality of shape memory structures; and
wherein an effective view factor or an area of thermal energy heat rejection to a sink temperature is lower when said plurality of shape memory structures and said facesheets are in said second position than when said plurality of shape memory structures and said facesheets are in said first position.

9. The system according to claim 1, wherein said thermal energy radiator is controlled by heating a shape memory material component of said shape memory structure.

10. The system of claim 1, said thermal energy radiator comprising an array of thermal energy radiators arranged in one of a series arrangement, a parallel arrangement, and combinations thereof in said thermal transport system, wherein each thermal energy radiator of said array of thermal energy radiators responds to a respective temperature local to a respective place in the array of thermal energy radiators.

11. The system of claim 2, wherein:
the active surface of said thermal energy radiator is obscured from the thermal environment and the inactive surface is exposed to the thermal environment when said shape memory structure and said facesheet are in said second position;
the active surface of said thermal energy radiator is exposed to the thermal environment and the inactive surface is obscured from the thermal environment when said shape memory structure and said facesheet are in said first position;
wherein the active and inactive surfaces may optionally be coated, covered, or treated to achieve a desired emissivity;
wherein the active and inactive surfaces may be obscured from the thermal environment or exposed to the thermal environment in whole or in part;
wherein an effective emissivity of thermal energy heat rejection to a sink temperature is lower when said shape memory structure and facesheet are in said second position; and
wherein said effective emissivity of thermal energy heat rejection to the sink temperature is higher when said shape memory structure and said facesheet are in said first position.

12. The system of claim 1, said thermal energy source comprising one or more heat sources in a spacecraft, said thermal energy radiator being positioned exterior of the spacecraft.

13. The system of claim 1, said shape memory structure being directly coupled to said facesheet such that force is transferred therebetween.

14. A thermal energy radiator for use on a spacecraft, the thermal energy radiator comprising:
a facesheet having a first surface and a second surface thereon, said facesheet having fluid passageways therein;
a shape memory structure, said shape memory structure comprising a material having temperature-sensitive shape memory properties inherent to said material, said shape memory structure having a first end and a second end, said second end being coupled to said facesheet, said shape memory structure having fluid passages that convey a working fluid between said first end and said fluid passageways of said facesheet;
wherein said second end being freely rotatable relative to said first end such that said shape memory structure repeatedly moves said second end between a first position when said working fluid is at a first temperature and a second position when said working fluid is at a second temperature such that said first surface and said second surface of said facesheet are either exposed to a thermal environment or obscured from the thermal environment by said facesheet.

15. The system of claim 14, said first surface being an active surface and said second surface being an inactive surface, said first surface having a higher emissivity value than said second surface.

16. The system of claim 14, wherein said fluid passages of said shape memory structure comprise an inner tubular member positioned within an outer tubular member, wherein a first path is defined by an inner boundary of the inner tubular member, and a second path is defined by an annulus between said inner tubular member and said outer tubular member.

17. The system of claim 16, further comprising:
an insulating structure positioned within said inner tubular member.

* * * * *